(12) United States Patent
Umemura et al.

(10) Patent No.: US 11,815,212 B2
(45) Date of Patent: Nov. 14, 2023

(54) EMERGENCY RELEASE MECHANISM FOR FLUID LOADING EQUIPMENT

(71) Applicants: KAWASAKI JUKOGYO KABUSHIKI KAISHA, Kobe (JP); TB GLOBAL TECHNOLOGIES LTD., Tokyo (JP)

(72) Inventors: Tomoaki Umemura, Kobe (JP); Shuntaro Unno, Kobe (JP); Kentaro Okumura, Kobe (JP); Tsutomu Kawai, Nagaoka (JP)

(73) Assignees: KAWASAKI JUKOGYO KABUSHIKI KAISHA, Kobe (JP); TB GLOBAL TECHNOLOGIES LTD., Tokyo (JP)

( * ) Notice: Subject to any disclaimer, the term of this patent is extended or adjusted under 35 U.S.C. 154(b) by 259 days.

(21) Appl. No.: 17/289,780

(22) PCT Filed: Oct. 28, 2019

(86) PCT No.: PCT/JP2019/042155
§ 371 (c)(1),
(2) Date: Apr. 29, 2021

(87) PCT Pub. No.: WO2020/090728
PCT Pub. Date: May 7, 2020

(65) Prior Publication Data
US 2021/0396338 A1 Dec. 23, 2021

(30) Foreign Application Priority Data
Oct. 30, 2018 (JP) .................................. 2018-204418

(51) Int. Cl.
*F16L 37/35* (2006.01)
*B67D 9/00* (2010.01)

(52) U.S. Cl.
CPC ................ *F16L 37/35* (2013.01); *B67D 9/00* (2013.01); *F16L 2201/20* (2013.01)

(58) Field of Classification Search
CPC ....... F16L 37/35; F16L 2201/20; F16L 37/32; B67D 9/00
See application file for complete search history.

(56) References Cited

U.S. PATENT DOCUMENTS 2,393,489 A * 1/1946 Trautman ............... F16L 37/252
137/614.02
3,367,366 A * 2/1968 Klatte ..................... F16L 37/23
137/614.05

(Continued)

FOREIGN PATENT DOCUMENTS

| CN | 203098929 U | 7/2013 |
| JP | 2008-111525 A | 5/2008 |

(Continued)

*Primary Examiner* — Zachary T Dragicevich
*Assistant Examiner* — James A Linford
(74) *Attorney, Agent, or Firm* — Oliff PLC

(57) ABSTRACT

Each of a pair of couplers includes: a vacuum double-pipe structure main part; a valve seat forming an opening through which a fluid flows; and a valve body in the main part. The valve body is configured such that, when separating the couplers, in each coupler, the body is brought into contact with the seat by a spring to close the opening, and when coupling the couplers, the body of each coupler is pressed by the body of the other coupler to move away from the seat and open the opening. The valve body includes: a holding member holding a sealing material sealing between the body and the seat when the body is in contact with the seat; a resin block covering a distal end surface of the holding member; and a metal operating member accommodating the block and protruding from the holding member to pass through the opening.

4 Claims, 4 Drawing Sheets

(56) References Cited

U.S. PATENT DOCUMENTS

| | | | | | |
|---|---|---|---|---|---|
| 4,512,369 | A | * | 4/1985 | Takahashi | F16L 37/35 |
| | | | | | 137/614.04 |
| 4,709,725 | A | * | 12/1987 | Morrison | F16L 1/26 |
| | | | | | 137/614.04 |
| 2018/0224034 | A1 | | 8/2018 | Kawai et al. | |
| 2020/0010314 | A1 | | 1/2020 | Kawai et al. | |

FOREIGN PATENT DOCUMENTS

| | | |
|---|---|---|
| JP | 2017-020584 A | 1/2017 |
| JP | 2018-128120 A | 8/2018 |
| KR | 20-2010-0010227 U | 10/2010 |

\* cited by examiner

EMERGENCY RELEASE MECHANISM FOR FLUID LOADING EQUIPMENT

TECHNICAL FIELD

The present invention relates to an emergency release mechanism for fluid loading equipment.

BACKGROUND ART

There are cases where fluid loading equipment (a loading arm) for a low-temperature fluid, which is installed at, for example, a harbor or port, incorporates therein an emergency release mechanism. When a carrier ship transporting a low-temperature fluid makes unexpected motion due to, for example, strong winds or high waves, the emergency release mechanism separates a fluid transfer line provided between the carrier ship and a ground storage facility into a ship-side line and a ground-side line, and releases the ship-side line from the ground-side line to prevent an excessive load from being applied to the fluid transfer line. Not only does the emergency release mechanism separate the fluid transfer line into the ship-side line and the ground-side line, the emergency release mechanism also seals up each of the ship-side line and ground-side line that have been separated from each other, thereby preventing the cargo fluid from flowing out of the ship-side line and the ground-side line.

For example, Patent Literature 1 discloses an emergency release mechanism including a pair of couplers that are coupled to each other by a clamp such that the couplers are separable from each other. FIGS. 8 and 9 of Patent Literature 1 show an example in which each coupler includes a coupler main part and a valve body. The coupler main part has a vacuum double-pipe structure. The valve body is disposed in the coupler main part such that the valve body is movable in the axial direction of the coupler main part. At the time of separating the couplers from each other, in each coupler, the valve body closes an opening of the coupler main part. On the other hand, at the time of coupling the couplers to each other, the valve body of each coupler is pressed by the valve body of the other coupler such that, in each coupler, the valve body opens the opening of the coupler main part.

CITATION LIST

Patent Literature

PTL 1: Japanese Laid-Open Patent Application Publication No. 2017-20584

SUMMARY OF INVENTION

Technical Problem

Prior to the present application, the applicant of the present application has proposed (in Japanese Patent Application No. 2017-023081) an emergency release mechanism that is improved from the emergency release mechanism disclosed in Patent Literature 1. The proposed emergency release mechanism includes a valve seat that is provided inside the distal end of the coupler main part. The valve seat forms an opening through which a cargo fluid flows, and the distal end portion of the valve body that opens and closes the opening is made of a resin.

At the time of separating couplers from each other, the distal end portion of the valve body of each coupler is exposed to the atmosphere through the opening. Therefore, in a case where the distal end portion of the valve body is made of a resin, even if the temperature of the cargo fluid is extremely low, such as liquefied hydrogen, liquefaction of oxygen around the distal end portion of the valve body can be suppressed. Meanwhile, the surface of the distal end portion of the valve body tends to be charged with static electricity.

In view of the above, an object of the present invention is to provide an emergency release mechanism for fluid loading equipment, the emergency release mechanism being capable of, at the time of separating the couplers from each other, preventing the surface of a portion of the valve body of each coupler, the portion being exposed to the atmosphere, from being charged with static electricity.

Solution to Problem

In order to solve the above-described problems, an emergency release mechanism for fluid loading equipment according to the present invention includes a pair of couplers that are coupled to each other by a clamp such that the couplers are separable from each other. Each of the pair of couplers includes: a coupler main part with a vacuum double-pipe structure; a valve seat provided inside a distal end of the coupler main part, the valve seat forming an opening through which a cargo fluid flows; a valve body disposed in the coupler main part such that the valve body is movable in an axial direction of the coupler main part; and a spring that urges the valve body toward the valve seat. The valve body is configured such that, at a time of separating the couplers from each other, in each coupler, the valve body is brought into contact with the valve seat by urging force of the spring so as to close the opening, and at a time of coupling the couplers to each other, the valve body of each coupler is pressed by the valve body of the other coupler so as to move away from the valve seat and open the opening. The valve body includes: a holding member that holds a sealing material that seals between the valve body and the valve seat when the valve body is in contact with the valve seat; a block made of a resin, the block covering a distal end surface of the holding member; and an operating member made of a metal, the operating member accommodating the block and protruding from the holding member in a manner to pass through the opening.

According to the above configuration, at the time of separating the couplers from each other, even though the operating member of the valve body of each coupler becomes exposed to the atmosphere through the opening, since the operating member is made of a metal, the surface of the operating member can be prevented from being charged with static electricity. In addition, thermal transfer between the holding member and the operating member is suppressed since the operating member accommodates the resin block, which covers the distal end surface of the holding member. Accordingly, even if the temperature of the cargo fluid is extremely low, such as liquefied hydrogen, liquefaction of oxygen around the operating member of the valve body can be suppressed.

For example, the operating member may include: a dome that accommodates the block; and a rod that extends from the dome along a center line of the coupler main part. The dome may be fixed to the holding member by using a plurality of bolts.

The dome may include: a peripheral wall that surrounds the block; and a ceiling wall that faces the holding member, with the block being positioned between the ceiling wall and the holding member. A plurality of sleeves may be interposed between the ceiling wall and the holding member. The plurality of bolts may be inserted through the plurality of sleeves, respectively. According to the above configuration, fastening force that is applied when the bolts are used can be received by the sleeves. Therefore, the peripheral wall of the dome of the operating member can be made thin. This makes it possible to further suppress the thermal transfer between the holding member and the operating member.

Advantageous Effects of Invention

The present invention makes it possible to, at the time of separating the couplers from each other, preventing the surface of a portion of the valve body of each coupler, the portion being exposed to the atmosphere, from being charged with static electricity.

DESCRIPTION OF EMBODIMENTS

Figure 1:
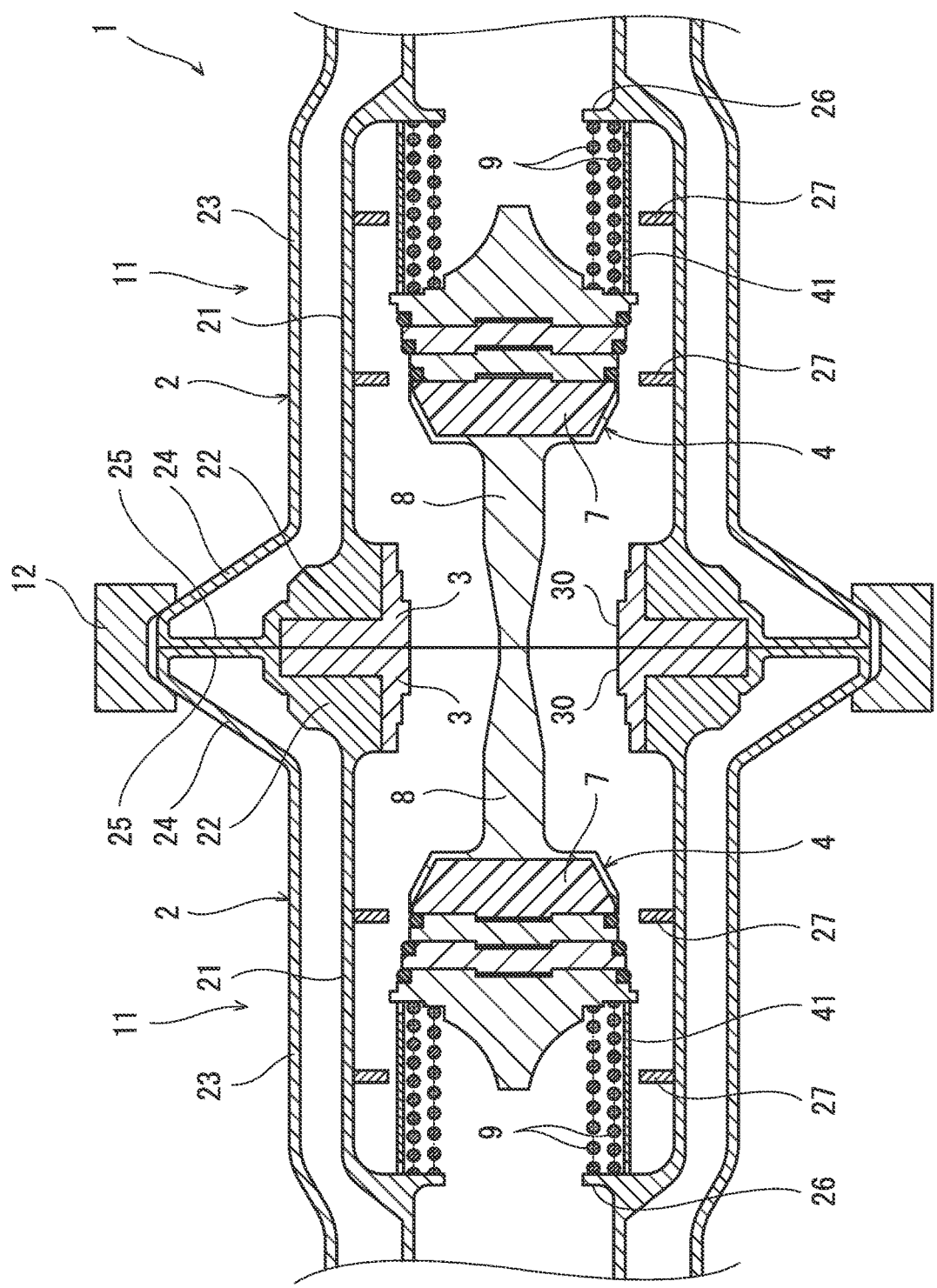
FIG. 1 is a sectional view of an emergency release mechanism for fluid loading equipment according to one embodiment of the present invention, the sectional view showing couplers at the time of fastening the couplers to each other.
Figure 2:
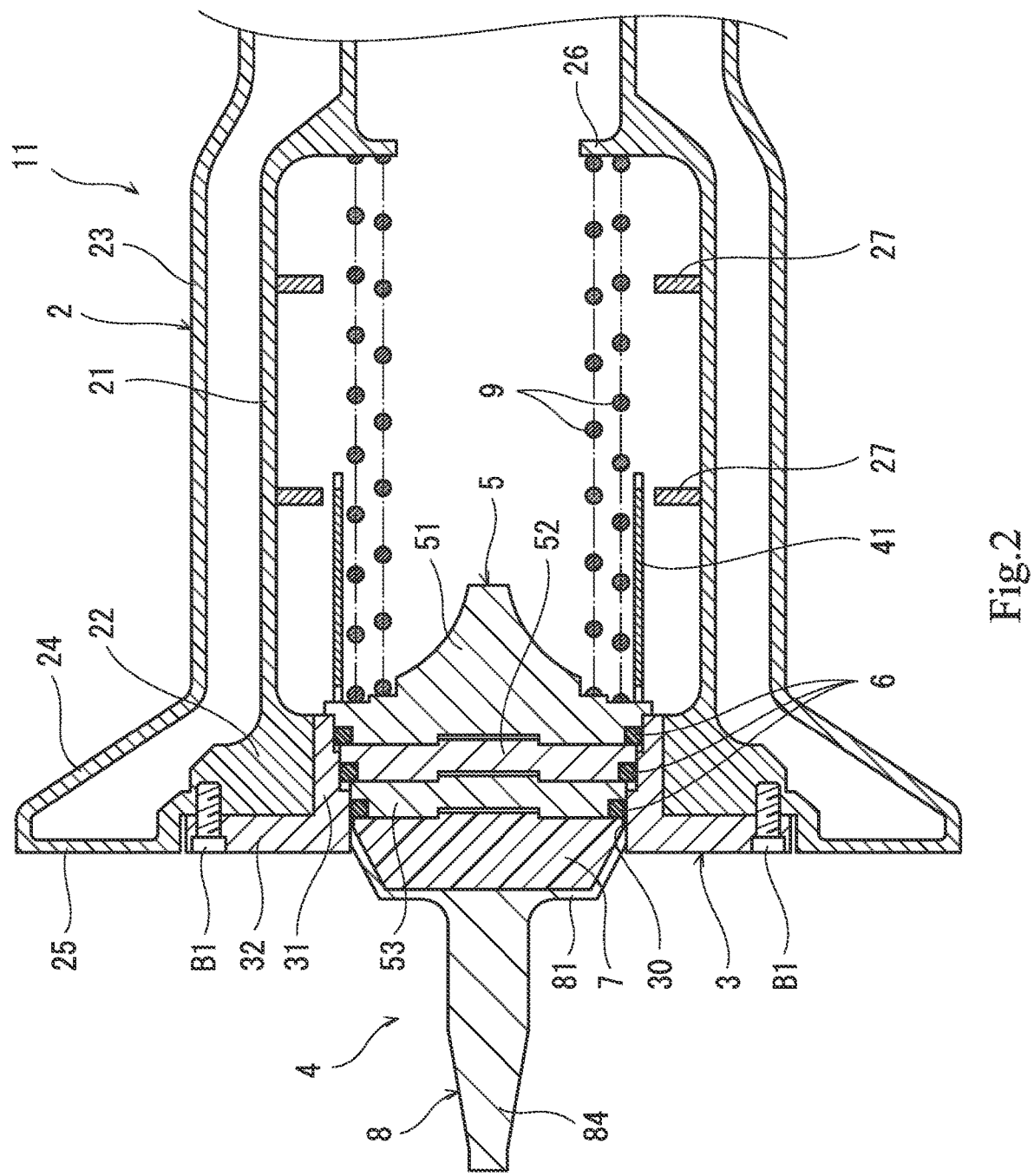
FIG. 2 is a sectional view showing one of the couplers at the time of separating the couplers from each other.
Figure 3:
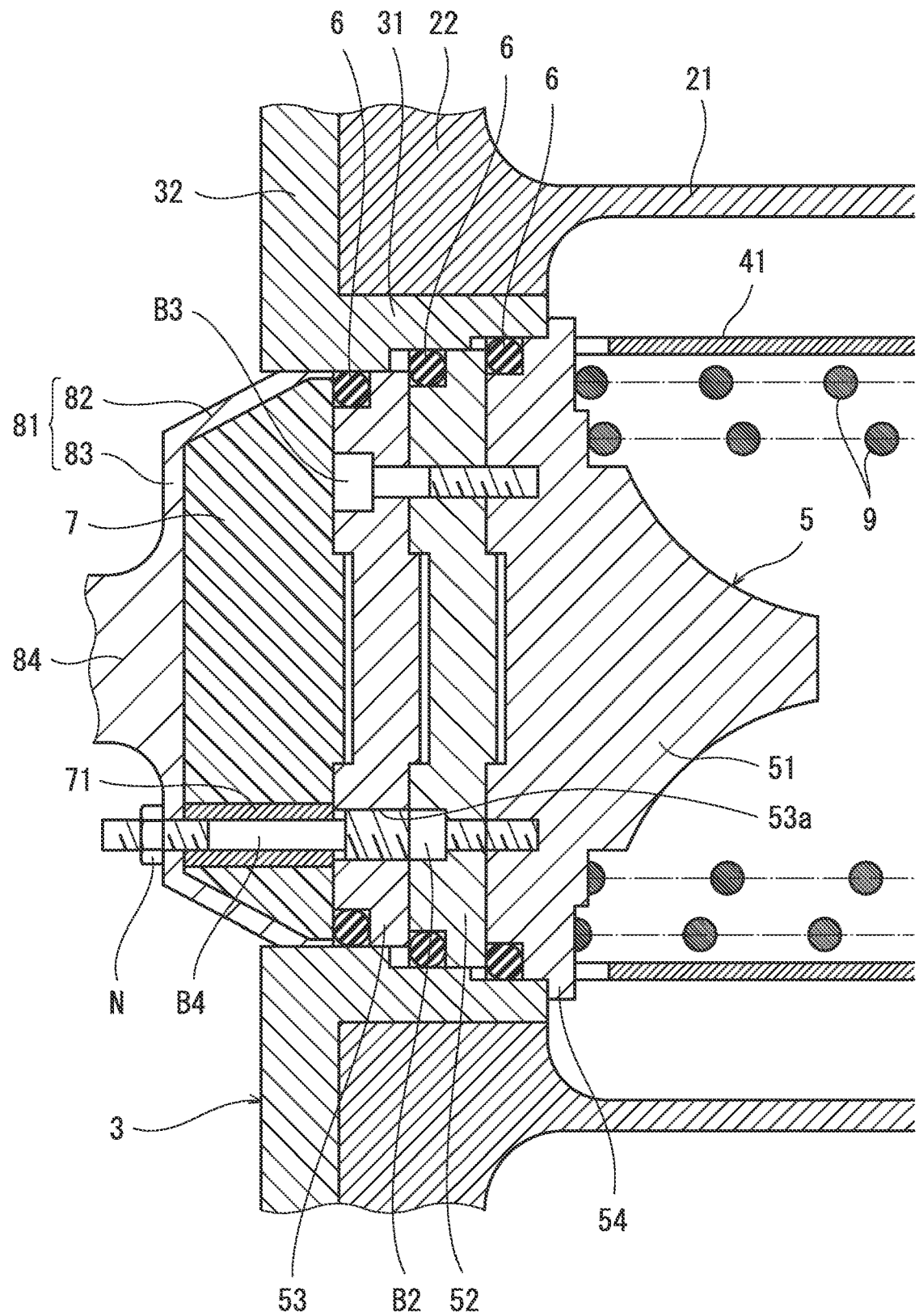
FIG. 3 is an enlarged view of an essential part of FIG. 2.

FIG. 1 to FIG. 3 show an emergency release mechanism 1 for fluid loading equipment according to one embodiment of the present invention. The emergency release mechanism 1 includes a pair of couplers 11, which are coupled to each other by a clamp 12 such that the couplers 11 are separable from each other. The clamp 12 is configured such that when force that causes the couplers 11 to move relative to each other becomes excessively great, the clamp 12 automatically releases the coupling between the couplers 11.

A cargo fluid herein is, for example, liquefied hydrogen whose temperature is extremely low. Alternatively, the cargo fluid may be a different low-temperature liquid, such as LNG, or may be low-temperature gas.

Each coupler 11 includes a coupler main part 2 and a valve body 4. The coupler main part 2 has a vacuum double-pipe structure. The valve body 4 is disposed in the coupler main part 2 such that the valve body 4 is movable in the axial direction of the coupler main part 2. Each coupler 11 further includes an annular valve seat 3, which is provided inside the distal end of the coupler main part 2. The valve seat 3 forms an opening 30, through which the cargo fluid flows. Hereinafter, for the sake of convenience of the description, the distal end side in the axial direction of the coupler main part 2 may be referred to as "forward", and the proximal end side, i.e., the opposite side, in the axial direction of the coupler main part 2 may be referred to as "backward".

Specifically, the coupler main part 2 includes an inner pipe 21 and an outer pipe 23, between which a vacuum space is formed. The distal end of the inner pipe 21 is provided with a flange 22, which protrudes radially outward and radially inward. The distal end of the outer pipe 23 is provided with an expanded diameter portion 24, and the clamp 12 is engaged with the expanded diameter portion 24.

The front end of the flange 22 of the inner pipe 21 and the front end of the expanded diameter portion 24 of the outer pipe 23 are connected to each other by an annular end plate 25.

The valve seat 3 includes a tubular part 31 and a flange 32. The tubular part 31 overlaps the inner peripheral surface of the flange 22 of the inner pipe 21. The flange 32 overlaps the distal end surface of the flange 22. The inner peripheral surface of the tubular part 31 forms the aforementioned opening 30. The flange 32 of the valve seat 3 is fixed to the flange 22 of the inner pipe 21 by a plurality of bolts B1 (see FIG. 2; the illustration of the bolts B1 is omitted in FIG. 1).

In the present embodiment, the valve body 4 is urged toward the valve seat 3 by two compression coil springs 9. Alternatively, the number of springs 9 may be one, or three or more. Back of the valve body 4, an annular support 26 is provided on the inner pipe 21, and the springs 9 are interposed between the support 26 and the valve body 4.

The valve body 4 is configured such that, at the time of separating the couplers 11 from each other, as shown in FIG. 2, in each coupler 11, the valve body 4 is brought into contact with the valve seat 3 by the urging force of the springs 9 so as to close the opening 30, whereas at the time of coupling the couplers 11 to each other, as shown in FIG. 1, the valve body 4 of each coupler 11 is pressed by the valve body 4 of the other coupler 11 so as to move away from the valve seat 3 and open the opening 30. When the valve body 4 is in contact with the valve seat 3, the valve body 4 fits in the opening 30.

A short tube 41 is mounted to the valve body 4 in a manner to surround the forward portion of the springs 9. Although not illustrated, the short tube 41 is provided with a large number of through-holes, through which the cargo fluid passes. The inner pipe 21 is provided with two guides 27, which guide the short tube 41. The two guides 27 are provided at respective positions that are away from each other in the axial direction of the inner pipe 21. Each of the guides 27 may be an annular guide that is continuous in the circumferential direction and provided with a large number of through-holes, or may be constituted by a plurality of pieces that are scattered in the circumferential direction.

More specifically, as shown in FIG. 2 and FIG. 3, the valve body 4 includes a holding member 5, a block 7, and an operating member 8. The holding member 5 holds at least one sealing material 6. The block 7 and the operating member 8 are mounted to the holding member 5.

When the valve body 4 is in contact with the valve seat 3, the sealing material 6 seals between the valve body 4 and the valve seat 3. In the present embodiment, three sealing materials 6 having different diameters from each other are disposed side by side in the axial direction of the coupler main part 2. The diameters of the respective sealing materials 6 increase backward from the frontmost sealing material 6 to the backmost sealing material 6. In accordance therewith, the inner peripheral surface of the valve seat 3 is formed in a stepped manner, such that the diameter of the inner peripheral surface increases backward. Alternatively, the number of sealing materials 6 may be one or two.

The holding member 5 is divided into three pieces, i.e., first to third pieces 51 to 53, disposed side by side in the axial direction of the coupler main part 2. The backmost first piece 51 holds the sealing material 6 having the greatest diameter. The first piece 51 is provided with a shoulder portion 54, which comes into contact with the valve seat 3. Also, the aforementioned short tube 41 is mounted to the first piece 51.

The middle second piece 52 holds the middle sealing material 6, and is fixed to the first piece 51 by a plurality of bolts B2 (FIG. 3 shows only one of the bolts B2; the illustration of the bolts B2 is omitted in FIGS. 1 and 2). The frontmost third piece 53 holds the sealing material 6 having the smallest diameter. The third piece 53 is fixed to the first piece 51 by a plurality of bolts B3 (FIG. 3 shows only one of the bolts B3; the illustration of the bolts B3 is omitted in FIGS. 1 and 2). The third piece 53 is provided with a plurality of screw holes 53a for fixing the operating member 8.

The block 7 covers the distal end surface of the holding member 5 (the surface positioned inside the sealing materials 6 and facing forward). The block 7 is made of a resin. Desirably, the resin of which the block 7 is made has low thermal conductivity.

The operating member 8 accommodating the block 7 protrudes from the holding member 5 in a manner to pass through the opening 30. The operating member 8 is made of a metal. For example, the metal of which the operating member 8 is made is a copper alloy.

To be more specific, the operating member 8 includes a dome 81 and a rod 84. The dome 81 accommodates the block 7. The rod 84 extends from the dome 81 along the center line of the coupler main part 2. The dome 81 is fixed to the holding member 5 by using a plurality of bolts B4 (FIG. 3 shows only one of the bolts B4; the illustration of the bolts B4 is omitted in FIGS. 1 and 2).

In the present embodiment, each bolt B4 is a bolt with threads formed on both ends thereof. One thread of each bolt B4 is screwed with a corresponding one of the screw holes 53a formed in the third piece 53 of the holding member 5, and the other thread of each bolt B4 is screwed with a corresponding one of nuts N. That is, in the present embodiment, the dome 81 is fixed to the holding member 5 by the bolts B4 and the nuts N.

As shown in FIG. 3, the dome 81 includes a peripheral wall 82 and a ceiling wall 83. The peripheral wall 82 surrounds the block 7. The ceiling wall 83 faces the holding member 5, with the block 7 being positioned between the ceiling wall 83 and the holding member 5. The peripheral wall 82 includes a straight portion and a tapered portion. The straight portion extends forward from the holding member 5. The tapered portion has a diameter that decreases from the front end of the straight portion. The peripheral edge of the ceiling wall 83 is connected to the front end of the tapered portion. In the present embodiment, the wall thickness of the straight portion is less than or equal to the half of the wall thickness of the tapered portion.

A plurality of sleeves 71 are interposed between the ceiling wall 83 and the holding member 5. The plurality of bolts B4 are inserted through the plurality of sleeves 71, respectively. The bolts B4 and the sleeves 71 are made of, for example, stainless steel.

As described above, in the emergency release mechanism 1 of the present embodiment, at the time of separating the couplers 11 from each other, even though the operating member 8 of the valve body 4 of each coupler 11 becomes exposed to the atmosphere through the opening 30, since the operating member 8 is made of a metal, the surface of the operating member 8 can be prevented from being charged with static electricity. In addition, thermal transfer between the holding member 5 and the operating member 8 is suppressed since the operating member 8 accommodates the resin block 7, which covers the distal end surface of the holding member 5. Accordingly, even if the temperature of the cargo fluid is extremely low, such as liquefied hydrogen, liquefaction of oxygen around the operating member 8 of the valve body 4 can be suppressed. Even if liquid oxygen is generated on the surface of the operating member 8, the liquid oxygen is prevented from coming into direct contact with the flammable resin, of which the block 7 is made.

VARIATIONS

The present invention is not limited to the above-described embodiment. Various modifications can be made without departing from the scope of the present invention.

For example, each of the bolts B4 used for fixing the dome 81 of the operating member 8 to the holding member 5 need not be a bolt with threads formed on both ends thereof. For example, as shown in FIG. 4, the bolts B4 may each be a headed bolt, and such bolts B5 may be used to fix the dome 81 to the holding member 5.

Figure 4:
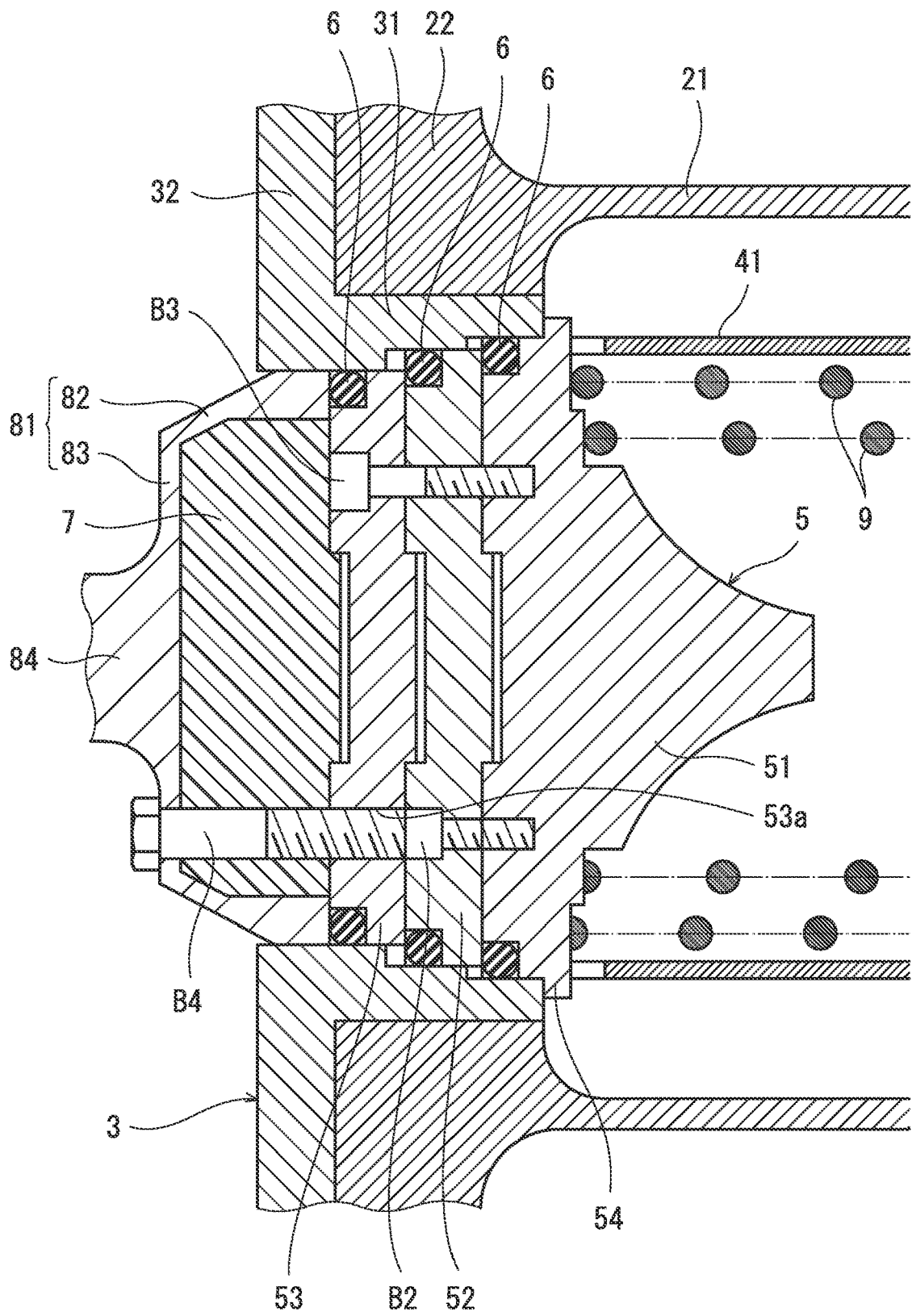
FIG. 4 is a sectional view of an essential part of a coupler according to a variation.

Instead of using the sleeves 71 shown in FIG. 3, the peripheral wall 82 of the dome 81 of the operating member 8 may include a thick straight portion as shown in FIG. 4. However, in a case where the sleeves 71 are used as in the above-described embodiment, fastening force that is applied when the bolts B4 are used can be received by the sleeves 71. Therefore, in this case, the peripheral wall 82 of the dome 81 of the operating member 8 can be made thin. This makes it possible to further suppress the thermal transfer between the holding member 5 and the operating member 8.

REFERENCE SIGNS LIST 1 emergency release mechanism
11 coupler
12 clamp
2 coupler main part
3 valve seat
30 opening
4 valve body
5 holding member
6 sealing material
7 block
71 sleeve
8 operating member
81 dome
82 peripheral wall
83 ceiling wall
84 rod
9 spring
B1 to B4 bolt

The invention claimed is:
1. An emergency release mechanism for fluid loading equipment, the emergency release mechanism comprising a pair of couplers that are coupled to each other by a clamp such that the couplers are separable from each other, wherein
  each coupler of the pair of couplers includes:
    a coupler main part with a vacuum double-pipe structure;
    a valve seat provided inside a distal end of the coupler main part, the valve seat forming an opening through which a cargo fluid flows;
    a valve body disposed in the coupler main part such that the valve body is movable in an axial direction of the coupler main part; and
    a spring that urges the valve body toward the valve seat,
  the valve body is configured such that,
    at a time of separating the couplers from each other, in each coupler, the valve body is brought into contact with the valve seat by urging force of the spring so as to close the opening, and at a time of coupling the couplers to each other, the valve body of each coupler is pressed by the valve body of the other coupler so as to move away from the valve seat and open the opening, and the valve body includes:

a holding member that holds a sealing material that seals between the valve body and the valve seat when the valve body is in contact with the valve seat;

a block made of a resin, the block contacting a distal end surface of the holding member; and an operating member made of a metal, the operating member accommodating the block and protruding from the holding member in a manner to pass through the opening wherein the operating member accommodates the block between the holding member and the operating member.

2. The emergency release mechanism for fluid loading equipment according to claim 1, wherein the operating member includes:

a dome that accommodates the block; and a rod that extends from the dome along a center line of the coupler main part, and the dome is fixed to the holding member by using a plurality of bolts.

3. The emergency release mechanism for fluid loading equipment according to claim 2, wherein the dome includes:

a peripheral wall that surrounds the block; and a ceiling wall that faces the holding member, with the block being positioned between the ceiling wall and the holding member, a plurality of sleeves are interposed between the ceiling wall and the holding member, and the plurality of bolts are inserted through the plurality of sleeves, respectively.

4. The emergency release mechanism for fluid loading equipment according to claim 1, wherein in a state where the couplers are separated from each other, the operating member passes through, protrudes from, and seals the opening.

* * * * *